United States Patent [19]

Duce

[11] Patent Number: 4,561,359
[45] Date of Patent: Dec. 31, 1985

[54] OVERHEAD CONVEYOR SYSTEMS
[75] Inventor: Edward Duce, Leeds, England
[73] Assignee: Stockrail Services Limited, Gomersal, England
[21] Appl. No.: 551,665
[22] Filed: Nov. 10, 1983
[30] Foreign Application Priority Data Nov. 11, 1982 [GB] United Kingdom ............... 8232232

[51] Int. Cl.⁴ ............................................. E61B 3/00
[52] U.S. Cl. ...................................... 104/94; 104/93; 104/107; 105/155; 105/156; 16/102; 16/103
[58] Field of Search ....................... 104/89, 91, 94, 93, 104/106, 107, 109, 111; 105/148, 155, 156, 150, 151; 16/97, 102, 103; 198/833, 687

[56] References Cited
U.S. PATENT DOCUMENTS

| | | | |
|---|---|---|---|
| 498,046 | 5/1893 | Allen | 16/97 |
| 3,814,022 | 6/1974 | Smith | 105/148 X |
| 3,910,406 | 10/1975 | Pulver et al. | 198/833 |
| 4,015,537 | 4/1977 | Graef et al. | 104/107 |
| 4,274,335 | 6/1981 | Boland | 105/150 |

FOREIGN PATENT DOCUMENTS 648290 12/1947 United Kingdom ............... 105/148

Primary Examiner—Robert B. Reeves
Assistant Examiner—Glenn B. Foster
Attorney, Agent, or Firm—David A. Jackson; Daniel H. Bobis

[57] ABSTRACT

The present invention provides that an overhead suspension system is provided with at least two suspension rails which are parallel, and at least one trolley which runs on the rails, the trolley having respective rollers which respectively engage the rails for the firm mounting of the trolley on the rails.

In a particular example, there is provided a novel form of roller head which comprises three rollers with their axes parallel, and the roller head is carried by a suspension bracket. When the suspension bracket is lifted for the hooking of the roller held between the rails, the head takes up a position in which it can be inserted between the rails, but when the suspension bracket is performing its function suspending a load, the roller head swivels so that a pair of rollers run on one rail, and the third roller engages the other rail, and as the rollers preferably are diablo rollers, the head effectively becomes locked between the rails, keeping the trolley on the rails, until such times as the suspension bracket is again lifted.

16 Claims, 12 Drawing Figures

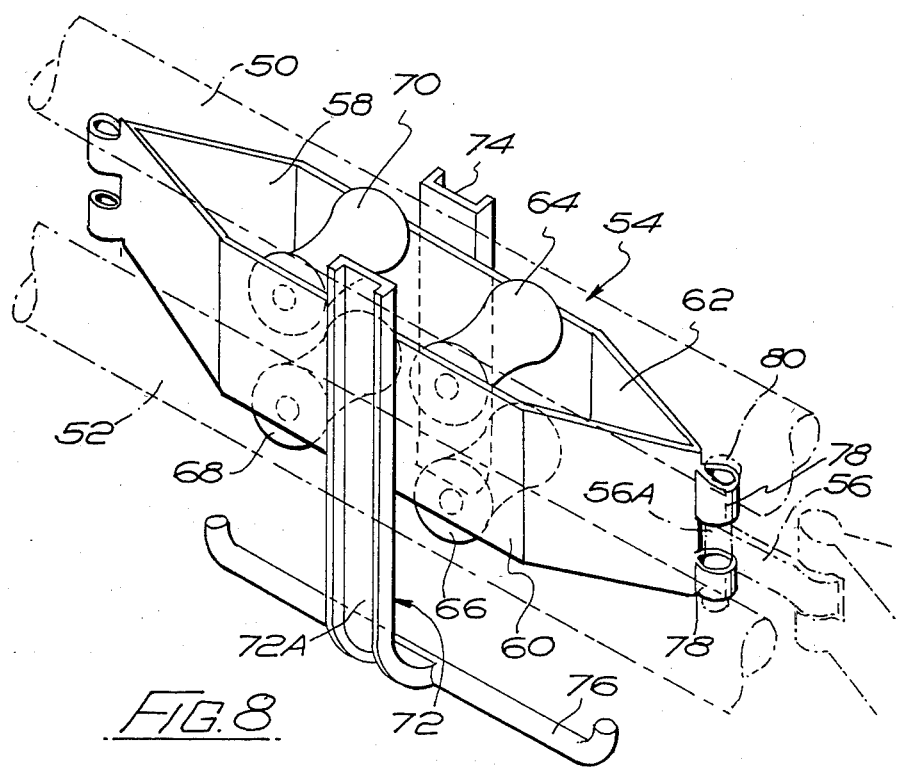
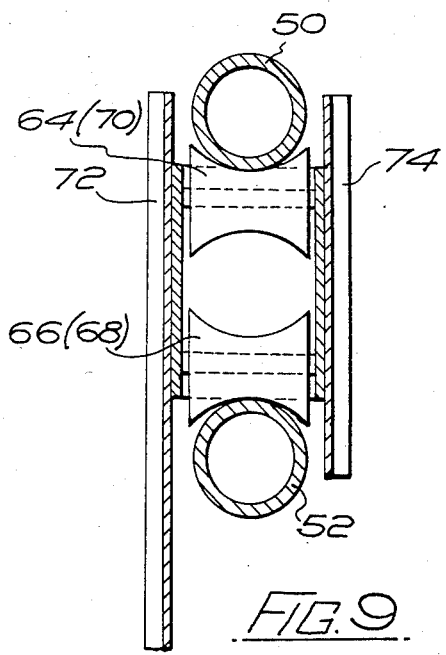

OVERHEAD CONVEYOR SYSTEMS

This invention relates to overhead conveyor systems, for example of the type used in factories for the transportation of goods from place to place within the factory. The invention is applicable to overhead conveyor systems for carrying any articles, either indoors or outdoors. Typically, an indoor overhead conveyor system would be used in a clothing manufacturing factory, but it is to be stressed that the invention is not to be considered as being limited to such application. The application of the invention to a clothing factory arises because in such a factory there is a requirement for pieces of cloth and partially finished garments to travel from one station to another, and to stop at the respective stations to be processed, for example sewn or pressed.

It is a requirement of overhead conveyor systems as used in clothing factories that the system should include trolleys for carrying the pieces of cloth, partially finished garments and finished garments, which trolleys are not only capable of travelling on overhead rails, but should also be capable of being removed from the rails by a simple unhooking action. To achieve the above, the said trolleys comprise one or more roller wheels known as diablo wheels, because they are waisted to enable the rail, which is of circular cross-section, to locate between the wheel flanges created by the waisting of the roller.

A typical trolley comprises a pair of diablo rollers, each connected to its own hanging bracket which is of G shape, and a suspension bar connected to the two brackets. The suspension bar serves as means for suspending garment hangers. Other forms of trolley are used, but the above type is the most common, and in any case, all known types employ the said diablo rollers running on a single circular sectional rail. All trolleys furthermore are required to be capable of being hooked on and off the rail.

Because of the above requirements and design, the known systems have a serious disadvantage that the trolleys have a tendency to jump off the rail when being moved from place to place, and apart from the fact that such displacements of the trolleys results in delays and a reduction in efficiency, these trolleys, especially when loaded, have significant inertia and if they strike a worker in falling serious injury can be inflicted. In fact serious injury has taken place from this cause.

The present invention is concerned with an overhead conveyor system which will be safer than the conventional systems in that the tendency of the trolleys of the system to fall off the rail will be much reduced. The preferred embodiments of the invention have other advantageous features, including that the trolleys can be hooked and unhooked from the rails as will be clear from the description of such embodiments given herein with respect to the accompanying drawings.

According to the general concept of the present invention, there is provided an overhead conveyor system wherein the supporting rail means for trolleys which run on the rail means comprises at least a pair of spaced rails, and the trolleys have respective rollers which engage the respective rails, whereby the trolleys are more securely held to the rails.

The use of spaced rails and trolley wheels engaging respective rails is new and provides a secure running arrangement for the trolley.

Preferably, the trolleys are adapted to be hooked and unhooked from the rails.

Preferably, each trolley comprises a roller assembly including at least two diablo rollers supported by mounting means, the assembly having a suspension bracket swivelably connected thereto, the said assembly being positionable so as to capable of passing between the said at least two rails, and when so passed between the rails, can be swivelled into a position in which the respective said at least two rollers engage the respective rails, holding the assembly firmly to the rails.

The said assembly may have three spaced rollers, arranged to define a triangular pattern with the point of suspension of the bracket approximately in the middle of a side of said triangle, the said mounting means being a pair of plates, and the assembly being arranged so that when the trolley is held in a position for hooking on to the rails, the assembly, by gravity, takes up the position in which it can be passed through the rails. When the trolley is released, the effect the trolley's gravity swivels the assembly so that two of said rollers engage one of said rails (which is in fact a lower rail) whilst the third roller engages the other (upper) rail. Under the weight of the trolley and any load carried thereby, the rollers actually become wedged between the two rails, ensuring the firm holding of the assembly and therefore of the trolley to the rails.

The said plates may be dimensioned and shaped so that they serve as an additional means of ensuring that the trolleys stay on the rails.

There will preferably be two of said assemblies, the respective brackets supporting a suspension bar means. The said suspension bar means may comprise a number of sections which are pivotally connected end to end, so that they can be unfolded to provide a long cantilevered arm for supporting the garments or garment pieces, enabling operators to work on the pieces whilst they remain suspended from the trolley. This is something which has never been possible before as the known trolleys cannot support a cantilevered load. With the present invention however, this can be achieved easily as the said assemblies do not become detached from the rails unless they are first of all swivelled relative to the rails. By virtue of the use of three rollers per assembly, the said assemblies can be made to swivel automatically to the unhooking position simply by pushing the trolley upwards. The swivelling of the assembly causes one of the rollers previously running on the lower rail to engage the upper rail, correctly positioning the assmbly for unhooking.

Other bracket and roller arrangements are possible within the scope of the present invention.

Thus, in another arrangement, a trolley for a twin rail suspensison arrangement of the invention, comprises means mounting four rollers two of which run on one rail and the other two of which run on the other rail, the rollers being rotatably supported by side plates of a chassis. The chassis may have retention bars on the outsides thereof which overlap the rails. One of the bars may be extended and may have at the end of the extension, the suspension bar means. The chassis may be adapted to be linked to similar chassis by pivot links so that the trolleys are connected in the nature of a link chain.

For the purposes of driving the trolleys, there may be a pair of endless drive bands which are driven and which have teeth designed for engaging the retention bars in order to drive the linked trolleys on the suspension rails. The rails may be in the form of an endless circuit and the chain of trolleys may likewise be endless.

The two rails will preferably be arranged in vertical alignment.

The invention also provides a roller assembly for use in a trolley useable with the system of the invention, and also provides a trolley for use in such system.

An embodiment of the present invention will now be described with reference to the accompanying diagrammatic drawings, wherein;

FIG. 8 shows in perspective view a section of a twin rail suspension system, with a trolley mounted thereon;

FIG. 9 is a central sectional elevation of the trolley shown in FIG. 8;

Figure 1:
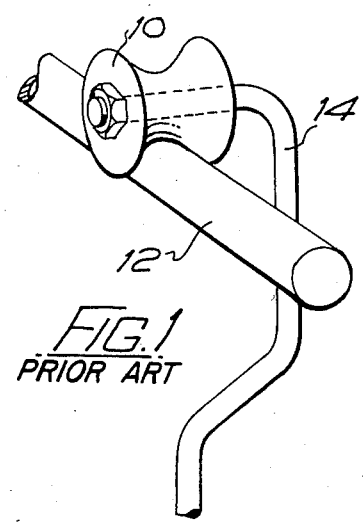
FIG. 1 is a perspective view of a conventional trolley diablo roller.
Figure 2:
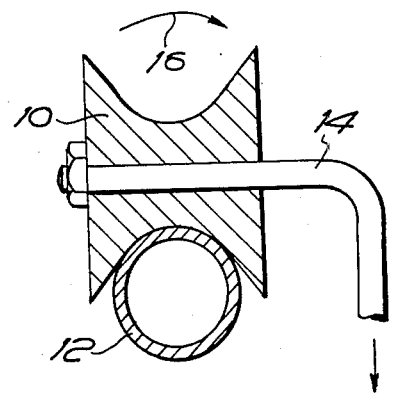
FIG. 2 is a sectional elevation of the roller shown in FIG. 1.

Referring to FIGS. 1 and 2, the Figs. show a roller 10 which is waisted so as to run on an overhead rail 12, the roller suspending a bracket 14 which in turn supports the load (not shown) to be transported by the trolley. In fact there are two of such rollers to each trolley these being spaced and supporting a bar on which garment hangers may be hung. The trolleys can be hooked to or unhooked from the rail 12 as will be understood from the drawings. These trolleys have a tendency to jump from the rail when in use, as explained herein, especially when turning corners and when trollies collide. Also, it is not possible to have any cantilevered load on the trolley as it would simply spin off the rail as indicated by the reference arrow Reference is now made to the remaining Figs. which show an embodiment of the invention.

Figure 3:
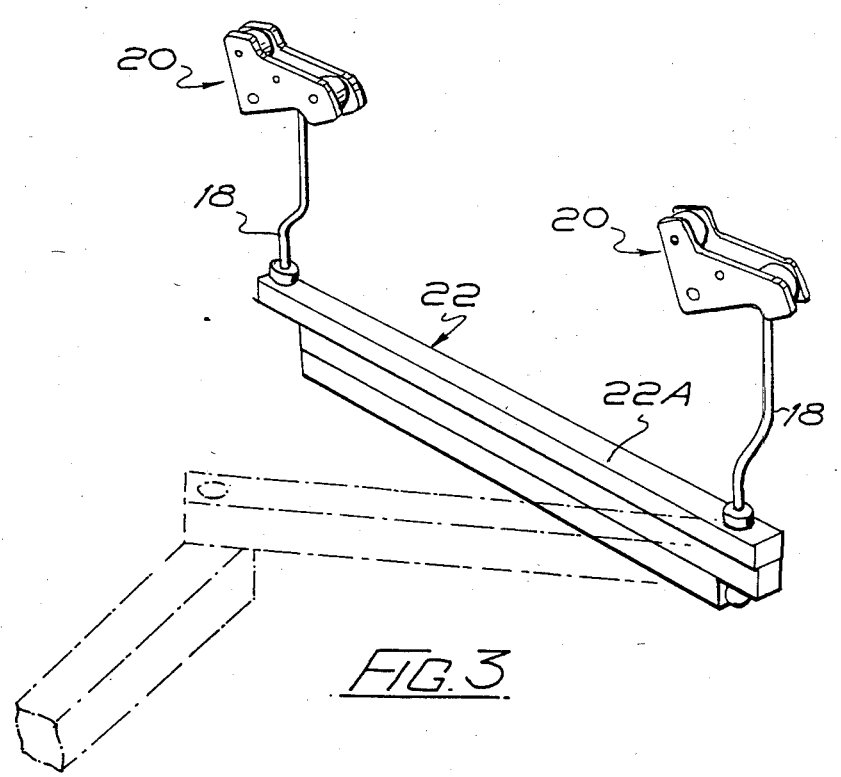
FIG. 3 is a perspective view of a trolley according to the invention.

A trolley is shown in FIG. 3 which comprises a pair of support brackets 18 which are similar to the bracket 14 shown in FIG. 1, and each is swivelably connected to a roller assembly 20 at the top end and to a support bar 22 assembly at the bottom end.

Figure 4:
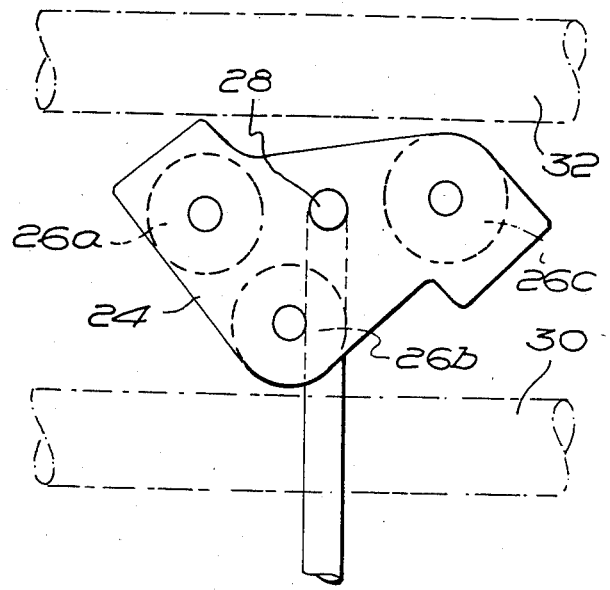
FIG. 4 is a side view of one of the assemblies of the trolley shown in FIG. 3.
Figure 5:
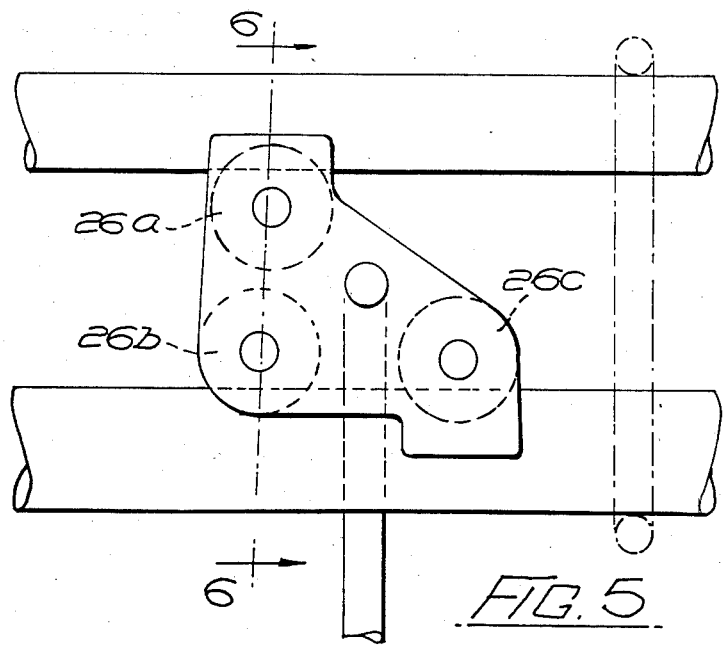
FIG. 5 is a side view similar to FIG. 4 but showing the assembly in a different position.

The design of the roller assembly is of particular importance in this embodiment, and the assembly comprises a pair of plates 24 of the shape shown in FIGS. 4 and 5 and between the plates 24 are three similar diablo rollers 26a, 26b and 26c which are freely rotatable about their axes. The assembly 20 is swivelable on the end of the bracket 18 about the axis 28.

The roller assemblies 20 are designed to be used with a suspension rail system in which there are twin rails 30 and 32, which is a substantial departure from the prior art arrangements, and by virtue of this departure, use can be made of the second rail for increasing the support capability of the rails. Therefore, the specific design of roller assembly described herein is not the only possible construction, but tests have shown it to have good performance.

Figure 6:
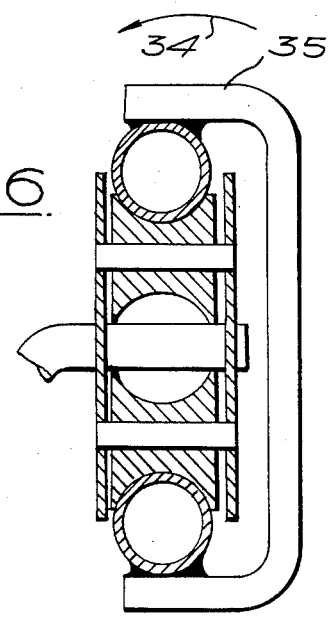
FIG. 6 is a sectional view of the assembly shown in FIG. 5, the section being taken on the line A—A of FIG. 5.

The assembly 20 is such that when supported freely on the bracket 18 it will hang as indicated in FIG. 4 in which position it can only just pass between the rails 30 and 32, and when the trolley is released so that the weight thereof rests on the rails 30 and 32, the rollers 26b and 26c engage the rail 30 and the roller 26a engages the rail 32 as shown in FIGS. 5 and 6. In this position the roller assembly 20 cannot be removed from the rails 30, 32 by means of a torque applied in the direction of arrow 34 in FIG. 6, and the assembly is therefore held firmly to the rails 30,32. The assembly 20 can of course still run freely on the rails 30,32 as the rollers 26 are freely rotatable. The lugs 24a and 24b of the plates 24 form additional security against the roller assemblies from leaving the rails 30,32. The rails 30,32 are held rigidly in parallel arrangement by means of coupling bars 35 welded to the rails 30,32.

To remove the trolley from the rails 30,32, it is simply a matter of raising the trolley, which has the effect of swivelling the assemblies 20 anti-clockwise until the rollers 26a and 26c engage the upper rail 32, when the assembly can be tilted outwards releasing it from the rails 30,32.

It can be seen therefore that an extremly simple arrangement in which the trolley is held firmly to the rails has been provided. It is appreciated that for existing systems to be converted to the arrangement of the present invention, an additional rail must be provided, but this represents little inconvenience compared to the advantages of the invention. All existing trollies can be converted by the addition of suitable roller assemblies, and new installations can be designed to have twin rails from the beginning.

Figure 7:
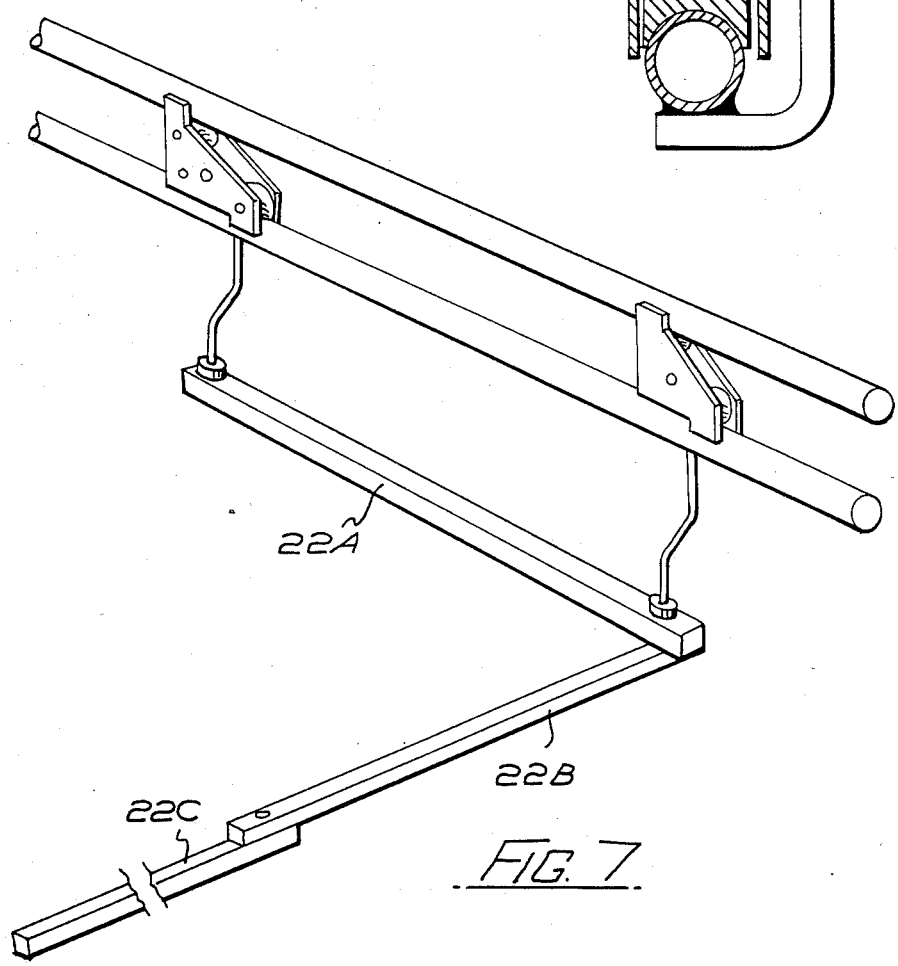
FIG. 7 is a perspective view of the trolley shown in FIG. 3, when in position on the rails.

FIG. 7 shows how the invention provides another significant advantage. The bar means is shown as being in three sections 22a, 22b and 22c which are pivotally connected end to end so that as shown in FIG. 7, the sections can be opened out to form a long cantilevered arm, from which work can be suspended. This can only be achieved by the invention due to the secure holding of the roller assemblies as described herein. The advantage of cantilevering the work is that an operator can perform his or her task on the work without removing the work from the trolley and the savings in efficiency by this measure are far greater than one might at first suspect.

Figure 12:
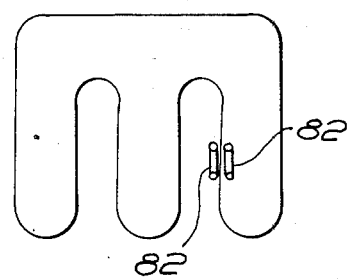
FIG. 12 is a plan view shown in a lay out of the suspension rail system.

Referring now to FIGS. 8 and 12, these figures show a twin rail suspension system in which the trolleys are not hookable and unhookable from the suspension rails, but must be removed therefrom by being directed into an open ended switch section of the conveyor rail system.

The conveyor rail system is made up of two parallel circular section guide rails 50, 52, located in spaced, vertical alignment so as to define an upper rail 50 and a lower rail 52. The rails 50, 52 are endless and are laid out in the "M" fashion indicated in FIG. 12, the total length of the endless path of the pattern being for example in the order of 250 feet. The rails are supported by suitable G brackets from overhead, and positioned between the rails are a plurality of trolleys 54, each as shown in FIG. 8, and the trolleys are pivotally connected in the nature of an endless chain, with the pivot axes being arranged vertically, and the trolleys being connected by link sections 56.

Each trolley 54 comprises a chassis 58 which resembles a ship's hull, comprising two side plates 60, 62 which are verical and parallel, and tapered hull sections at the respective ends of the plates 60, 62.

Between the side plates 60, 62 are arranged four frictionless diablo rollers 64–70, whose axes lie on the corners of a quadrilateral or square so that the rollers 64–70 are arranged in pairs with their axes vertically aligned. The horizontal spacing between the rollers 64–70 will be dictated by the most severe curve of the track system on which the trolleys have to run. The rollers 64–70 may be of any suitable construction, although it is preferred that rollers comprising inner and outer races between which are rolling elements such as balls, be used.

FIG. 9 shows clearly how the upper 64,70 and lower 66, 68 rollers roll respectively on the underside and the topside of the two rails 50, 52 of the suspension rail circuit, and FIG. 9 also shows the extent to which retention bars 72, 74 on the outside of the side plates 60, 62 extend above the top and bottom edges of the side plates, thereby to keep the trolleys 54 effectively on the rail pairs. One of the retention bars 72 has an extension 72A which projects downwardly, and to the lower end of the extension, which has a curved end, is mounted a suspension bar 76 for the purposes herein described.

The hull sections at the ends of the chassis are provided with hinge lugs 78, these being shaped, and between the hinge lugs is located an end 56a of the adjacent link section 56, which also has a hinge lug. A hinge pin 80 arranged with its axis vertical engages in the lugs 78, 56A in order to hingedly connect the chassis ends to the link sections 56. The link sections 56 at the other ends are similarly connected to adjacent trolleys.

Figure 10:
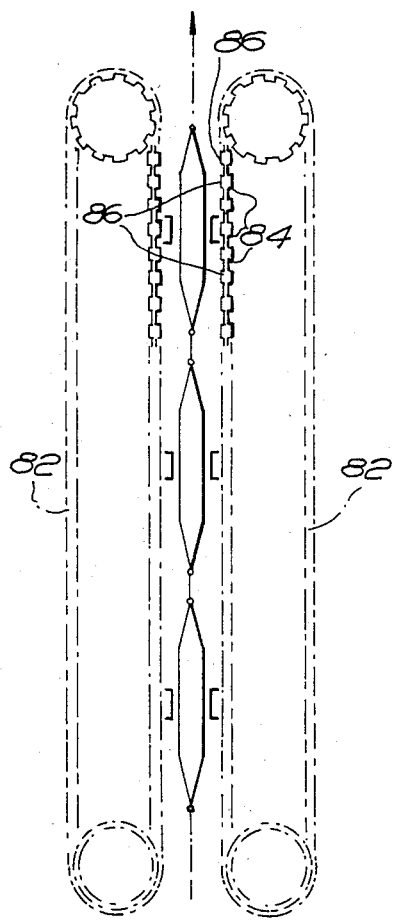
FIG. 10 is a plan view illustrating how the trolleys each as shown in FIG. 8 are propelled.
Figure 11:
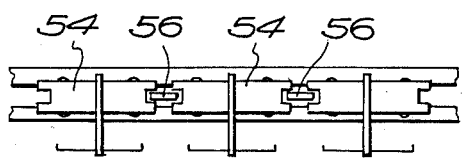
FIG. 11 is a side view showing several trolleys each as shown in FIG. 8 in side elevation on the twin suspension rails.

The chain of trolleys is propelled by means of a pair of endless drive bands 82 as best illustrated in FIG. 10. Each drive band is a double toothed band. That is to say it has drive teeth on the outside and inside surfaces. The teeth 84 on the inside surface are engaged by drive sprockets, and the teeth 86 on the outside surface, as shown in FIG. 10, engage in the hollow centres of the retention bars 72, 74, which are of profiled section for this purpose.

The arrangement as illustrated in FIGS. 8 to 12 possesses the advantage of the invention that a twin rail suspension system is provided, ensuring positive holding of the trolleys at the respective contacts with the respective rails of respective rollers, although the system of these figures does not permit of hooking and unhooking the trolleys from any points in the circuit of FIG. 12. FIG. 12 also shows how the drive bands 82 may be located in relation to the circuit lay out. The bands could of course be located anywhere as required, and several pairs of drive bands may be employed if necessary. Alternative drive arrangements can be used.

It is again mentioned that the invention can be applied in any circumstances requiring overhead transportation of acticles by means of trolleys with special effect in circumstances which require the trolleys to be capable of being hooked to and unhooked from an overhead rail system at will.

I claim:

1. An overhead suspension system wherein the system comprises at least one trolley and guide rails, characterized in that there are at least two guide rails in spaced parallel relationship, each trolley is provided with rollers which roll on the guide rails, thereby to provide more secure mounting of the trolley, the guide rails comprise two in number and are arranged in vertically spaced disposition, and each trolley comprises at least one roller head swivelably mounted on a suspension bracket, each said roller head comprising three rollers with their axes parallel, and being laterally insertable between the rails, but being adapted to take up a position when the suspension bracket hangs freely, in which two of the rollers run on the bottom rail, and the top roller rides on the underside of the top rail.

2. A system according to claim 1, wherein the rollers are mounted on spaced parallel head plates which, in the operative position overlap the guide rails further to prevent displacement of the roller heads laterally relative to the guide rails.

3. A system according to claim 2, wherein each trolley has two roller heads swivelably mounted on respective suspension brackets, and connected between the brackets is a suspension bar.

4. A system according to claim 1, wherein each trolley comprises four rollers mounted on a chassis with their axes parallel, and the trolley runs between the two rails with two of the rollers engaging one rail, and two of the rollers engaging the other rail.

5. A system according to claim 4, wherein there are retention bars on the outsides of the chassis which overlap the guide rails further to prevent lateral displacement of the trolleys relative to the guide rails.

6. A system according to claim 4, wherein there are a plurality of trolleys linked in the nature of a chain and pivotable relative to each other about a vertical axis.

7. A system according to claim 4, wherein the said rails are of circular section, and the rollers are diablo rollers.

8. A system according to claim 7, wherein there are endless drive bands for propelling the trolleys, said endless drive bands having teeth which engage the retention bars for the driving of the trolleys.

9. A system according to claim 1, wherein the trolley has an arm which can be arranged in cantilevered fashion in relation to the said rails, for supporting goods laterally of the rails.

10. A system according to claim 9, wherein said arm is made up of pivotally interconnected or telescoping sections which can be arranged in line to extend outwards from the trolly by more than the trolley length.

11. A system according to claim 9, wherein the arm is pivotally connected to the trolley so as to be movable to a position in line with the trolley.

12. In or for a trolley for an overhead suspension system comprising a pair of vertically spaced parallel guide rails, a roller head which is for swivelable connection to a suspension bracket, said roller head comprising three rollers arranged with their axes parallel and at the corners of the triangle formed thereby having a long side and two shorter sides, the roller head being insertable laterally between the guide rails when the long side of the triangle is parallel to the rails, but being locked to the rails when the roller head is under load performing its supporting function, and two of the rollers run on the lower rail, the third roller engaging the underside of the upper rail.

13. A roller head according to claim 12, wherein the said swivel point is located so that when the head is supported at the swivel point, the roller head will take up a position wherein the said long side of the triangle is approximately horizontal, when the roller head is under load by the trolley hanging on the suspension rail system and under gravity, with or without a load, the head pivots so that a pair of rollers run on the bottom rail, and the third roller engages the underside of the top rail.

14. An overhead suspension system comprising:
two guide rails arranged in vertically spaced disposition; and
at least one trolley, each trolley including at least one roller head swivelably mounted on a suspension bracket, each said roller head comprising three rollers with their axes parallel, and being laterally insertable between the rails, but being adapted to take up a position when the suspension bracket hangs freely, in which two of the rollers run on the bottom rail, and the top roller rides on the underside of the top rail, said trolley further including support bar means being positionable between a first transport position in which the bar means extends in a direction parallel to the guide rails, and a second working position in which the bar means extends cantilever fashion from the trolley to enable presentation of goods carried by the trolley to a work station disposed laterally of the guide rails.

15. A system according to claim 14, wherein the bar means comprises an arm pivotable on the trolley by one of its ends.

16. A system according to claim 14 or 15 wherein the bar means comprises two lengths of bar pivotally connected end to end.

* * * * *